United States Patent [19]
Watanabe

[11] Patent Number: 5,600,482
[45] Date of Patent: Feb. 4, 1997

[54] OPTICAL AMPLIFIER CIRCUIT CAPABLE OF CARRYING OUT STABLE AMPLIFICATION

[75] Inventor: Seiji Watanabe, Tokyo, Japan

[73] Assignee: Nec Corporation, Tokyo, Japan

[21] Appl. No.: 401,226

[22] Filed: Mar. 9, 1995

[30] Foreign Application Priority Data

Mar. 10, 1994 [JP] Japan .................................. 6-039775

[51] Int. Cl.$^6$ ........................................................ H01S 3/16
[52] U.S. Cl. ........................................... 359/341; 359/337
[58] Field of Search ................................... 359/341, 337

[56] References Cited

U.S. PATENT DOCUMENTS 5,276,549  1/1994  Tagawa et al. ........................ 359/341
5,327,282  7/1994  Takeda et al. ........................ 359/341
5,404,413  4/1995  Delavaux et al. ..................... 385/15

FOREIGN PATENT DOCUMENTS 4289829  10/1992  Japan .

*Primary Examiner*—Mark Hellner
*Attorney, Agent, or Firm*—Sughrue, Mion, Zinn, Macpeak & Seas

[57] ABSTRACT

In an optical amplifier circuit for amplifying input signal light by the use of excitation light having polarized light component into amplified output light, an optical fiber doped with a rare-earth element amplifies the input signal light into the amplified output light. A light converter is coupled to the excitation light source and converts the excitation light into a converted excitation light having depolarized light component.

5 Claims, 2 Drawing Sheets

OPTICAL AMPLIFIER CIRCUIT CAPABLE OF CARRYING OUT STABLE AMPLIFICATION

BACKGROUND OF THE INVENTION

This invention relates to an optical amplifier circuit for directly amplifying input signal light.

In order to directly amplify input signal light, an optical amplifier circuit comprises an excitation light source for generating excitation light, a wave combiner for combining the excitation light with the input signal light to produce combined light, an optical fiber doped with a rare-earth element, such as Neodymium, Erbium, or Ytterbium, to be excited by the excitation light. Generally, the excitation light is regarded as polarized light. The optical fiber amplifies the input signal light included in the combined light into amplified output light.

In the optical fiber, the rare-earth element is excited by the excitation light. On the other hand, the input signal light is amplified by stimulated emission effect of the rare-earth element excited by the excitation light while the input signal light passes through the optical fiber. Such as optical amplifier circuit is disclosed in Japanese Unexamined Patent Publication No. 289829/1992 (Tokkai Hei 4-289829).

The wave combiner has a loss dependent upon a polarization state of the excitation light. In other words, the loss in the wave combiner varies with the polarization state of the excitation light. The polarization state varies with environment condition, such as wavelength of the excitation light, ambient air temperature, or vibration effected on the optical amplifier circuit. This means that the strength of the excitation light delivered from the wave combiner varies with the polarization state. Such a variation of the strength of the excitation light causes a variation of an amplification degree of the input signal light because an excitation state in the optical fiber varies with the strength of the excitation light. For the reason, a conventional optical amplifier circuit is unstable in amplification degree.

SUMMARY OF THE INVENTION

It is therefore an object of this invention to provide an optical amplifier circuit which is capable of carrying out stable amplification without influence of a polarization state of excitation light.

On describing the gist of this invention, it is possible to understand that an optical amplifier circuit is for amplifying input signal light by the use of excitation light into amplified output light. The optical amplifier circuit comprises an excitation light source for generating the excitation light having polarized light component, an optical fiber doped with a rare-earth element to be excited by the excitation light. The optical fiber amplifies the input signal light into the amplified output light. The optical amplifier circuit further comprises light supplying means coupled to the excitation light source for supplying the excitation light to the optical fiber.

According to this invention, the optical amplifier circuit still further comprises light converting means coupled between the excitation light source and the light supplying means for converting the excitation light into a converted excitation light having depolarized light component.

DESCRIPTION OF THE PREFERRED EMBODIMENT

Figure 1:
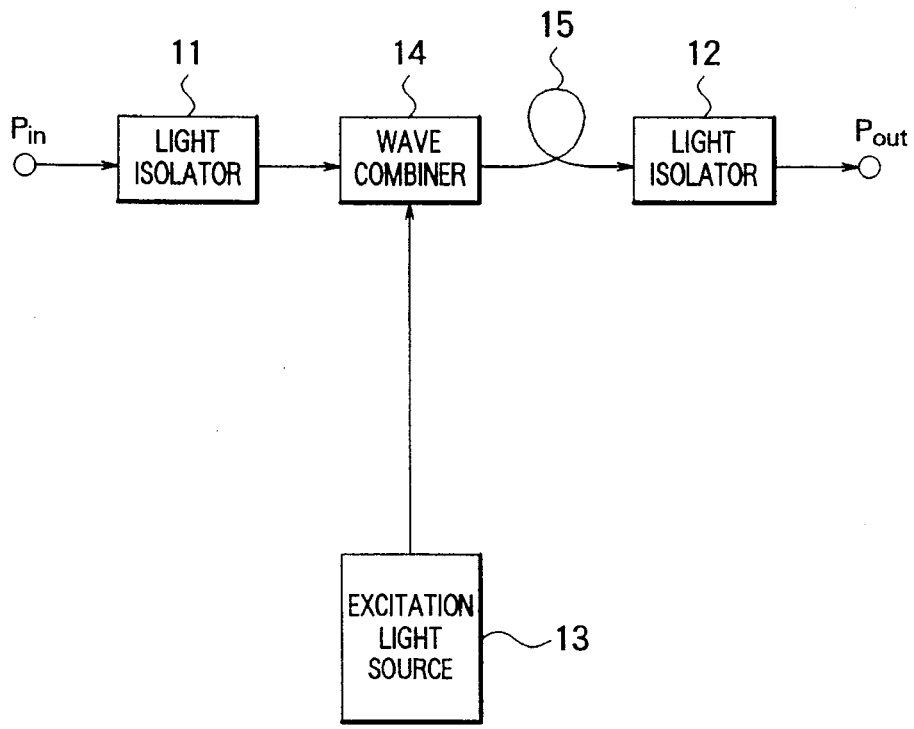
FIG. 1 shows a block diagram of a conventional optical amplifier circuit.

Referring to FIG. 1, description will be made at first regarding a conventional optical amplifier circuit in order to facilitate an understanding of this invention. The optical amplifier circuit is for directly amplifying input signal light received through an incident port Pin and is called an optical direct amplifier circuit. The optical amplifier circuit delivers amplified output light through an output port Pout. The optical amplifier circuit comprises first and second light isolators 11 and 12, an excitation light source 13 for generating excitation light which is characterized by polarized light, such as a laser diode, a wave combiner 14 connected to the first light isolator 11 and the excitation light source 13. The optical amplifier circuit further comprises an optical fiber 15 connected between the wave combiner 14 and the second isolator 12 and doped with a rare-earth element, such as Neodymium, Erbium, or Ytterbium.

The input signal light is supplied to the wave combiner 14 through the first light isolator 11. As well known in the art, the first light isolator 11 is for removing reflection return light that is reflected from connection points, for example, the connection point between the wave combiner 14 and the optical fiber 15, in the optical amplifier circuit. The wave combiner 14 further supplied with the excitation light from the excitation light source 13. The wave combiner 14 combines the excitation light with the input signal light and delivers combined light to the optical fiber 15.

In the optical fiber 15, the rare-earth element is excited by the excitation light included in the combined light. On the other hand, the input signal light included in the combined light is amplified into amplified light by stimulated emission effect of the rare-earth element excited by the excitation light while the input signal light passes through the optical fiber 15. The amplified light is delivered to the output port Pout, as the amplified output light, through the second light isolator 12. Like the first light isolator 11, the second light isolator 12 is for removing reflection return light that is reflected from the connection points in the optical amplifier circuit. In addition, there is a case where the excitation light source 13 and the wave combiner 14 are connected to an output side of the optical fiber 15 as mentioned in a reference cited in the background of the invention.

In the meanwhile, the wave combiner 14 has a loss dependent upon a polarization state of the excitation light. In other words, the loss in the wave combiner 14 varies with the polarization state of the excitation light. The polarization state varies with environment condition, such as a wavelength of the excitation light, ambient air temperature, or vibration effected on the optical amplifier circuit. This means that the strength of the excitation light delivered from the wave combiner 14 varies with the polarization state. Such a variation of the strength of the excitation light further causes a variation of an amplification degree of the input signal light because an excitation state of the optical fiber 15 varies with the strength of the excitation light. As a result, the optical amplifier circuit becomes unstable in amplification degree.

Figure 2:
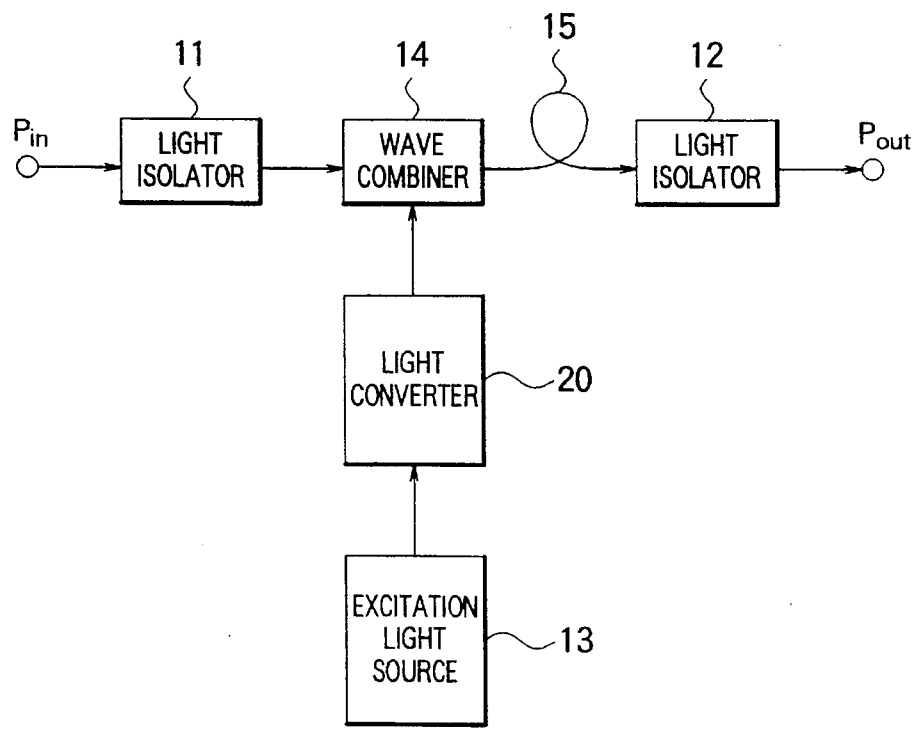
FIG. 2 shows a block diagram of an optical amplifier circuit according to a preferred embodiment of this invention.
Figure 3A:
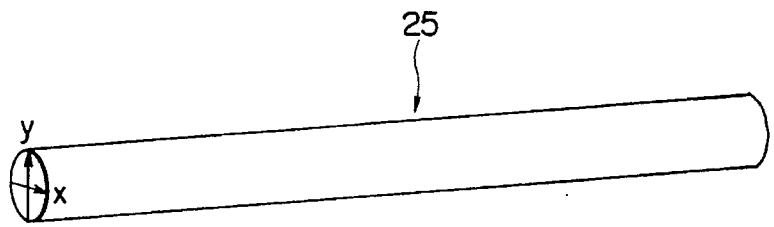
FIG. 3 shows illustrations for describing manufacturing process of a light converter illustrated in FIG. 2.
Figure 3B:
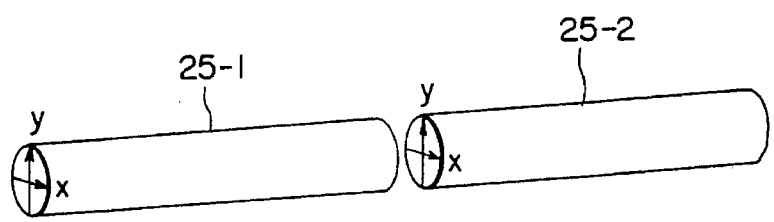
Figure 3C:
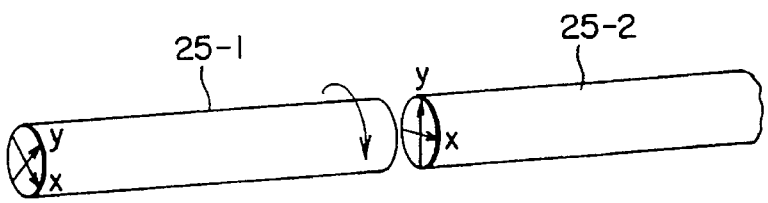
Figure 3D:
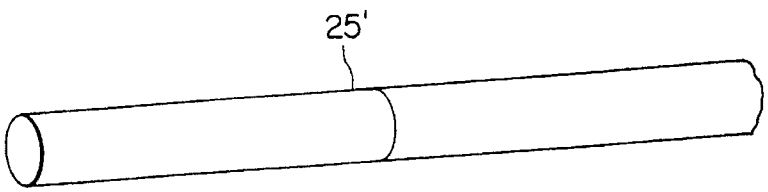

Referring to FIG. 2, the description will proceed to an optical amplifier circuit according to a preferred embodiment of this invention. The optical amplifier circuit is similar to that illustrated in FIG. 1 except that a light converter 20 is coupled between the excitation light source 13 and the wave combiner 14. The light converter 20 is for converting the excitation light into converted excitation light which is characterized by depolarized light. In the example, the light converter 20 is implemented by a polarization maintaining optical fiber which is called a PANDA fiber.

Referring to FIG. 3, the description will be made as regards manufacturing process of the light converter 20 mentioned above. In FIG. 3(a), the polarization maintaining optical fiber is depicted at 25. Let an end surface of the polarization maintaining optical fiber 25 have x and y axes x and y orthogonally crossing at a center point thereof as shown in FIG. 3(a). In FIG. 3(b), the polarization maintaining optical fiber 25 is cut into first and second parts 25-1 and 25-2. Each of the first and the second parts 25-1 and 25-2 has a cut surface. Each of the cut surfaces has the same surface as the end surface illustrated in FIG. 3(a). Next, as illustrated in FIG. 3(c), the first part 25-1 is turned around a center axis thereof by a predetermined angle. It is desirable that the predetermined angle is substantially equal to forty-five degrees. Then, the cut surface of the first part 25-1 is connected to the cut surface of the second part 25-2 in the manner known in the art. Thus, it is possible to obtain the polarization maintaining optical fiber 25' which serves as the light converter 20. The excitation light obtained by the light converter 20 is characterized by the depolarized light and has no influence of the environment condition mentioned before. In other words, the excitation light has no variation of the polarization state. This means that the excitation light delivered from the wave combiner 14 is stable in strength. In addition, processes illustrated in FIGS. 3(a) and 3(b) may be omitted. In this event, a pair of polarization maintaining optical fibers which are the same with each other are provided beforehand.

Turning back to FIG. 2, the input signal light is supplied to the wave combiner 14 through the first light isolator 11. The wave combiner 14 is further supplied with the excitation light characterized by the depolarized light from the light converter 20. The wave combiner 14 combines the excitation light with the input signal light and delivers combined light to the optical fiber 15.

In the optical fiber 15, the rare-earth element is excited by the excitation light included in the combined light. On the other hand, the input signal light included in the combined light is amplified into amplified light by stimulated emission effect of the rare-earth element excited by the excitation light. The amplified light is delivered, as the amplified output light, to the output port Pout through the second light isolator 12.

Inasmuch as the wave combiner 14 is supplied with the excitation light which is characterized by the depolarized light, the excitation light delivered from the wave combiner 14 becomes stable in strength. As a result, the optical amplifier circuit according to this invention can amplify the input signal light by a constant amplification degree.

Although the wave combiner 14 is connected to an input side of the optical fiber 15 together with the excitation light source 13 and the light converter 20, the wave combiner 14 may be connected to an output side of the optical fiber 15 together with the excitation light source 13 and the light converter 20. In this event, the excitation light delivered from the wave combiner 14 is supplied to the optical fiber 15 from the opposite direction relative to that described in conjunction with FIG. 2.

What is claimed is:

1. An optical amplifier circuit for amplifying input signal light into amplified output light, comprising:

an excitation light source for generating excitation light having a polarized light component;

an optical fiber doped with a rare-earth element to be excited by said excitation light, said optical fiber amplifying said input signal light into said amplified output light;

light supplying means coupled to said optical fiber for supplying said excitation light to said optical fiber; and light converting means coupled between said excitation light source and said light supplying means for converting said excitation light into converted excitation light having a depolarized light component.

2. An optical amplifier circuit of claim claim 1, wherein said light converting means is implemented by a polarization maintaining optical fiber, said polarization maintaining optical fiber comprising first and second parts which are serially connected to each other in a state that one of said first and said second parts is rotated around a center axis thereof by a predetermined angle.

3. The optical amplifier circuit of claim 2, wherein said light supplying means is connected to an input side of said optical fiber.

4. An optical amplifier circuit of claim 2, wherein said light supplying means is connected to an output side of said optical fiber.

5. The optical amplifier circuit of claim 2, further comprising a wave combiner for combining said excitation light with said input signal light to supply combined light to said optical fiber.

\* \* \* \* \*